(No Model.)

C. F. BRIGHAM.
FIRE AND WATER PROOF MATERIAL FOR ROOFING, &c.

No. 298,282. Patented May 6, 1884.

Witnesses,
John F. C. Prentkerk
B. J. Noyes

Inventor,
Charles F. Brigham
by Crosby & Gregory attys.

United States Patent Office.

CHARLES F. BRIGHAM, OF WORCESTER, MASSACHUSETTS, ASSIGNOR OF THREE-FOURTHS TO D. AUSTIN BROWN, TRUSTEE.

FIRE AND WATER PROOF MATERIAL FOR ROOFING, &c.

SPECIFICATION forming part of Letters Patent No. 298,282, dated May 6, 1884.

Application filed September 21, 1883. (No model.)

To all whom it may concern:

Be it known that I, CHARLES F. BRIGHAM, of Worcester, county of Worcester, State of Massachusetts, have invented an Improvement in Fire and Water Proof Material for Roofing, Sheathing, &c., of which the following description, in connection with the accompanying drawings, is a specification, like letters on the drawings representing like parts.

My invention has for its object the production of a suitable material for roofing, sheathing, and other purposes, when a fire and water proof material is desired; and my invention consists, essentially, in a material composed of asbestus molded or formed into boards or sheets treated in succession with silicate of soda and chloride of calcium.

Figure 1:
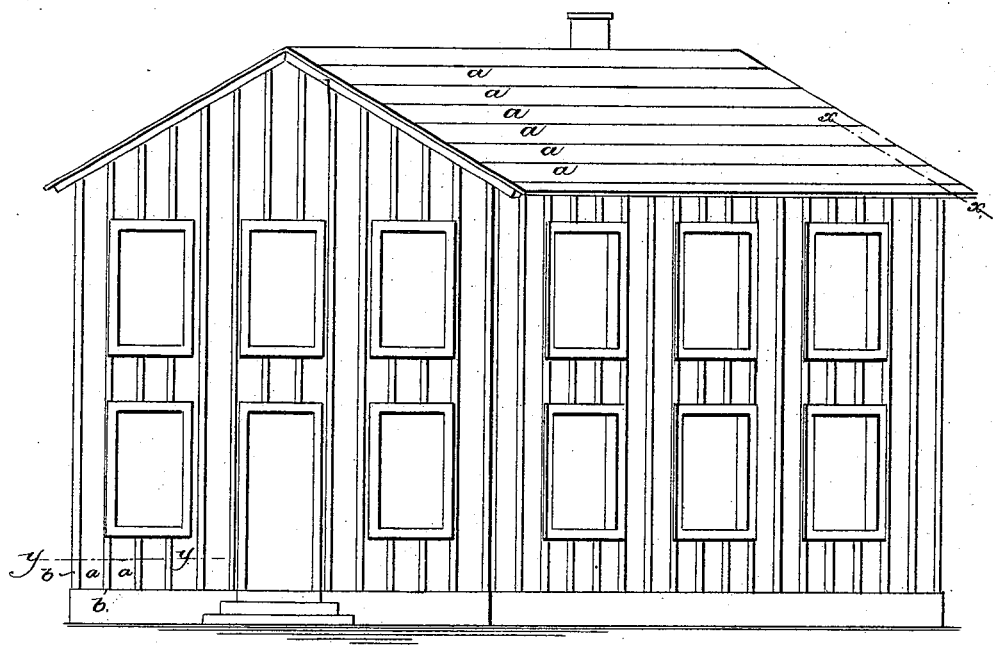
Figure 3:
Figure 2:
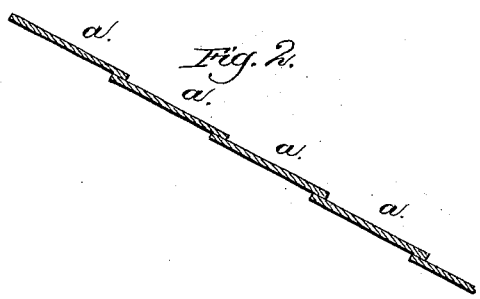

Figure 1 of the drawings represents a building roofed and sided with my improved material; Fig. 2, a section taken through part of the roof at $x$; Fig. 3, a section taken through the side at $y$.

To adapt ordinary asbestus board or paper made in usual manner for the purposes herein provided for, I treat the same, first, with silicate of soda, preferably applying the same by means of a brush, and thereafter I treat the material thus prepared with chloride of calcium, the two materials thus applied in succession in a liquid state more or less saturating the asbestus board or paper, and forming a surface upon it which is practically fire and water proof, the said silicate of soda and chloride of calcium preferably entering the joints in the roof or sides between contiguous pieces of asbestus board or paper.

The fire and water proof material may be composed of narrow boards, as at $a$, having their edges suitably overlapped, as shown in Fig. 2; or the edges of the material may be abutted together more or less closely and be covered by a batten, $b$, as shown in Fig. 3, and the parts may be nailed or screwed to the frame of the building in usual manner; or the edges may be overlapped as usual in clapboarding and shingling.

My improved material may be shaped to resemble shingles or clapboards.

In applying the silicate of soda I usually reduce it to about one-half its usual strength, as in such condition it better penetrates the paper and incorporates itself with the asbestus; but the chloride of calcium is preferably of standard strength; and the chloride of calcium is applied when the silicate of soda is partially dried.

I claim—

The herein-described roofing or sheathing, composed of asbestus board or paper treated with silicate of soda and with chloride of calcium, substantially as described.

In testimony whereof I have signed my name to this specification in the presence of two subscribing witnesses.

CHARLES F. BRIGHAM.

Witnesses:
G. W. GREGORY,
B. J. NOYES.